(12) United States Patent
Barykin et al.

(10) Patent No.: US 9,442,967 B2
(45) Date of Patent: Sep. 13, 2016

(54) SYSTEMS AND METHODS FOR EFFICIENT DATA INGESTION AND QUERY PROCESSING

(71) Applicant: Facebook, Inc., Menlo Park, CA (US)

(72) Inventors: Oleksandr Barykin, Sunnyvale, CA (US); Josh Metzler, Redwood Shores, CA (US)

(73) Assignee: Facebook, Inc., Menlo Park, CA (US)

( * ) Notice: Subject to any disclaimer, the term of this patent is extended or adjusted under 35 U.S.C. 154(b) by 202 days.

(21) Appl. No.: 13/951,431

(22) Filed: Jul. 25, 2013

(65) Prior Publication Data
US 2015/0032725 A1 Jan. 29, 2015

(51) Int. Cl.
*G06F 17/30* (2006.01)

(52) U.S. Cl.
CPC ... *G06F 17/30327* (2013.01); *G06F 17/30539* (2013.01); *G06F 17/3048* (2013.01); *G06F 17/30545* (2013.01)

(58) Field of Classification Search
None
See application file for complete search history.

(56) References Cited

U.S. PATENT DOCUMENTS

| | | | |
|---|---|---|---|
| 6,026,388 A * | 2/2000 | Liddy | G06F 17/30654 |
| 6,484,161 B1 * | 11/2002 | Chipalkatti | G06F 17/30545 |
| 6,879,266 B1 * | 4/2005 | Dye et al. | 341/51 |
| 2006/0271547 A1 * | 11/2006 | Chen | G06F 17/30215 |
| 2008/0027920 A1 * | 1/2008 | Schipunov | G06F 17/30539 |
| 2008/0162592 A1 * | 7/2008 | Huang | G06F 11/3476 |
| 2008/0270704 A1 * | 10/2008 | He | G06F 11/1076 711/129 |
| 2009/0157948 A1 * | 6/2009 | Trichina et al. | 711/103 |
| 2010/0122039 A1 * | 5/2010 | Kumar et al. | 711/147 |
| 2011/0131174 A1 * | 6/2011 | Birch et al. | 707/607 |
| 2013/0117323 A1 * | 5/2013 | Lohiya | G06F 17/30539 707/793 |
| 2014/0136779 A1 * | 5/2014 | Guha | G06F 9/5066 711/114 |
| 2014/0195558 A1 * | 7/2014 | Murthy | G06F 17/30545 707/770 |
| 2014/0280032 A1 * | 9/2014 | Kornacker | G06F 17/30442 707/718 |
| 2014/0379990 A1 * | 12/2014 | Pan | G06F 12/0804 711/135 |

* cited by examiner

Primary Examiner — Aleksandr Kerzhner
Assistant Examiner — Eddy Cheung
(74) *Attorney, Agent, or Firm* — Sheppard Mullin Richter & Hampton LLP

(57) ABSTRACT

A query may be provided to aggregators at hierarchical levels in an in-memory data storage module. The query may be provided to leaf nodes of the in-memory data storage module. The leaf nodes may execute the query, returning results of the query to the aggregators. One or more aggregations may be performed based on the results. In an embodiment, log entries associated with a logged event may be serialized and divided into distributed chunks for storage in the leaf nodes. A leaf node, from the leaf nodes, having storage capacity for a distributed chunk may be identified. The distributed chunk may be stored in the leaf node.

18 Claims, 8 Drawing Sheets

SYSTEMS AND METHODS FOR EFFICIENT DATA INGESTION AND QUERY PROCESSING

TECHNICAL FIELD

The technical field relates to the field of social networking systems. More particularly, the technical field relates data management techniques in social networking systems.

BACKGROUND

Social networks have revolutionized electronic communications by providing users with interactive ways to communicate and connect with one another. Social networks have allowed users to exchange electronic messages, share images and video, and indicate relationships with each other. Social networks have also created online message boards and communities where users can interact with each other. Due to the popularity of these and other features, a significant portion of humanity maintains membership in some form of social network.

Even routine usage of social networks may involve creation of large volumes of data. More specifically, users of a social network may generate data related to how various segments of the social network are performing, data related to trends in content generated or accessed by users, behavioral data about users of the social network, and other data. Given the extensive amount of data, efficiently monitoring and managing the data in a social network may prove a difficult task for administrators. For example, quality assurance teams and product development teams may find it difficult to quickly and reliably search the data maintained by a social network.

SUMMARY

A system may comprise at least one processor and a memory storing instructions configured to instruct the at least one processor to perform providing a query to aggregators at hierarchical levels in an in-memory data storage module. The query may be provided to leaf nodes of the in-memory data storage module. The query may be executed on the leaf nodes. The results of the query may be returned to the aggregators. One or more aggregations on the results of the query may be performed.

In some embodiments, the aggregators may comprise one or more of: a root data aggregator, an intermediate data aggregator, or a leaf data aggregator. Providing the query to the leaf nodes may comprise identifying a plurality of leaf data aggregators to provide the query to the plurality of leaf nodes.

In some embodiments, the query may be received using a web application programming interface (API) or a structured query language (SQL) interface.

In some embodiments, performing one or more aggregations comprises instructing at least one of the aggregators to perform leaf data aggregation. Performing one or more aggregations may comprise instructing at least one of the aggregators to perform intermediate data aggregation. Performing one or more aggregations may comprise instructing at least one of the aggregators to perform root data aggregation. Performing one or more aggregations may comprise determining at least one of a count, a minimum value, a maximum value, a sum, an average, a percentile, or a histogram.

In some embodiments, the query may be validated. Validating the query may comprise determining whether the query includes a request for a time range of data. Validating the query may comprise determining whether the query correctly calls an aggregation function. Validating the query may comprise determining whether semantic parameters of the query are valid.

In some embodiments, the leaf nodes may be configured to expire data based on an age criterion or a space criterion.

In some embodiments, the log entries associated with a logged event may be serialized. Further, the serialized log entries may be divided into distributed chunks for storage in the leaf nodes of an in-memory data storage module. A leaf node may be identified from the leaf nodes, the leaf node having storage capacity for a distributed chunk. The distributed chunk may be stored in the leaf node.

In some embodiments, identifying the leaf node may comprise: randomly selecting a first leaf node and a second leaf node from the leaf nodes; determining the first leaf node has greater storage capacity than the second leaf node; and selecting the first leaf node for storage of the distributed chunk. The logged event may comprise one or more of a performance event on a computing system, user interaction with the computing system, or a behavioral event on the computing system.

In some embodiments, the system may be incorporated into a social networking system.

A computer implemented method may comprise providing a query to aggregators at hierarchical levels in an in-memory data storage module. The method may comprise providing the query to leaf nodes of the in-memory data storage module, and executing the query on the leaf nodes. The method may further comprise returning results of the query to the aggregators, and performing one or more aggregations on the results of the query.

A computer medium may store computer-executable instructions that, when executed, cause a computer system to perform a computer-implemented method that comprises providing a query to aggregators at hierarchical levels in an in-memory data storage module. The query may be provided to leaf nodes of the in-memory data storage module, and the query may be executed on the leaf nodes. Results of the query may be returned to the aggregators, and one or more aggregations may be performed on the results of the query.

Many other features and embodiments of the invention will be apparent from the accompanying drawings and from the following detailed description.

Figure 1:
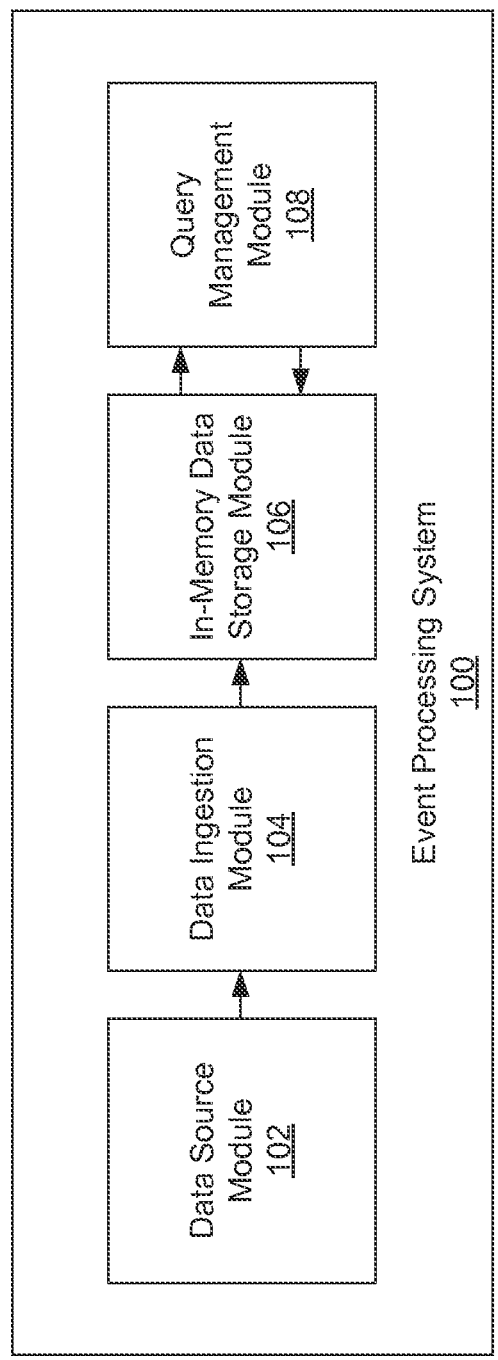
FIG. 1 shows an example of an event processing system, in accordance with some embodiments.

The figures depict various embodiments of the present invention for purposes of illustration only, wherein the figures use like reference numerals to identify like elements. One skilled in the art will readily recognize from the following discussion that alternative embodiments of the structures and methods illustrated in the figures may be employed without departing from the principles described herein.

DETAILED DESCRIPTION

Efficient Data Ingestion and Query Processing

A social networking system may include a complex web of interdependent subsystems. Problems in any of these subsystems may cause issues that can propagate through the social networking system. As an example, problems in a web server may cause problems elsewhere in the social networking system. To help operators identify problems and monitor the state of the social networking system, persistent event processing systems may be employed. The persistent event processing systems may use hard-drives to store event logs of events that occur on the social networking system. Operators seeking to understand the events may query the hard-drives for information, such as performance or user interaction metrics, that are likely linked to the events. Only after evaluating the information on the hard-drives may operators conduct an informed analysis of the event.

However, the process of writing to and querying hard-drives may take hours or even days. Operators may not have access to information about events soon after the events occur. As a result, social networking systems with persistent event processing systems may not have sufficiently low latency to ensure effective operation. Social networking systems with persistent event processing systems also may not provide sufficiently responsive tools for operators. That is, operators may not be able to evaluate the behavior of users of a social networking system or user interactions with the social networking system in a timely manner.

FIG. 1 shows an example of an event processing system 100, in accordance with some embodiments. The event processing system 100 may include a data source module 102, a data ingestion module 104, an in-memory data storage module 106, and a query management module 108. The components in this figure and all figures herein are exemplary only, and may be variously replaced by, combined with, or integrated into other similar components. The event processing system 100 may provide information about events that are occurring on a social networking system. Events processed by the event processing system 100 may include performance events of the social networking system. Performance events may include how hardware or software of the social networking system is performing. More specifically, performance events may include metrics such as processing load, numbers of cache requests, network throughput, time required by a server to generate a page, or any other metrics. Rapidly providing information about performance events may prove relevant for members of quality assurance teams, such as site performance teams, who may monitor and attempt to optimize hardware or software performance of the social networking system. Examples of performance events may also include error reports related to problems in one or more of the modules that make up the social networking system.

Events processed by the event processing system 100 may also include user events, such as different types of user interaction with the social networking system. Examples of user events may include information about data trends, words in users' posts, surges in word frequencies, demographic information (e.g., users' countries, ages, genders, etc.) of users posting content to the social networking system, etc.

As another example, the event processing system 100 may provide information about behavioral events on the social networking system. Behavioral events may include information relating to how different users of a social networking system respond to changes in a web or mobile platform associated with the social networking system. Examples of behavioral events include information about usage patterns, such as user locations or ages, product parameters (e.g., devices, operating systems, etc.), or keywords in bug reports. Examples of behavioral events may further include usage of a mobile application associated with the social networking system, interactions of users of the social networking system with advertisements, interactions of users with a new page or feature provided by the social networking system, or any other activity that may be influenced by a change to the social networking system. The event processing system 100 may also provide information about arbitrary data on the social networking system. Arbitrary data may include any data an operator of the social networking system is interested in obtaining.

In some embodiments, rapidly providing information about events may prove invaluable to product development engineers or performance evaluation personnel who may be interested in understanding user interaction with information in the social networking system. Rapidly providing information about events may also prove relevant for product development managers or performance evaluation personnel who may want to evaluate responses of different users of the social networking system to changes on a website or mobile application associated with the social networking system.

The data source module 102 may capture data relating to an event on the social networking system. The data source module 102 may include web servers, backend server systems, or data imported from persistent data storage systems. The data source module 102 may also include devices that allow users of a social networking system to access portions of web servers or backend server systems.

In an embodiment, the data source module 102 may provide log entries that represent events. Each log entry may be based on one or more logging calls implemented in the data source module 102. Each log entry may have a standard format for ingestion by the data ingestion module 104. In various embodiments, each log entry may include at least one field that provides a unique identifier for the log entry. In some embodiments, a timestamp, such as a Unix timestamp, may serve as the unique identifier of each log entry provided by the data source module 102. Use of a timestamp to uniquely identify log entries may allow the data source module 102 and the other modules of the event processing system 100 to efficiently capture information about time-varying phenomena.

A log entry from the data source module 102 may have a standardized data format to describe events occurring in the social networking system. In an embodiment, the standardized data format may include an integer field, a string field, a string set field that contains unordered strings, and a string vector field that contains ordered sets of strings. The integer field may include information used for aggregations, comparisons, and groupings. In some embodiments, the integer field may include a timestamp of an event. In various embodiments, a timestamp portion of a log entry, such as a UNIX timestamp, in the integer field may be required for the log entry to be considered by the event processing system 100. As a result, the timestamp portion may be taken as an index of a given row of data represented by the data source module 102. It is noted that use of the timestamp field to identify log entries may be particularly advantageous to identify and analyze time-varying phenomena.

The string field of the standardized data format may include character strings. The string field may include information for performing comparisons and groupings of text. The string set field of the standardized data format may include unordered sets of strings. As just one example, the string set field may include information for representing words in a post on a social networking system. As just another example, the string set field may also include information for representing sets of features (e.g., a graph search, a news feed redesign, etc.) that are true for a given user of the social networking system. The string vector field of the standardized data format may include ordered sets of character strings. The string vector field may include information for performing stack traces in the social networking system. In an embodiment, the order of data in the string vector field may correspond to a level of a stack trace in the social networking system.

In an embodiment, the standardized data format may comprise a table. The first column of the table may include integer fields that are populated with the UNIX timestamp of events being logged in the social networking system. The remaining columns of the table may include populated integer fields, string fields, string set fields, and string vector fields. Each of the populated fields may be indexed by the UNIX timestamp of the first column of the table. Each row of the table may describe an event on a social networking system.

It is noted that the standardized data format may support other types of fields without departing from the scope and substance of the inventive concepts described herein. It is also noted that the standardized data format need not support various data types, such as floating numbers, that may take large amounts of memory to store. In some embodiments, other data types, such as floating number types, may be represented as one of the fields of the standardized data format. For instance, the integer field may be used to represent other data types, such as floating number types.

Figure 2:
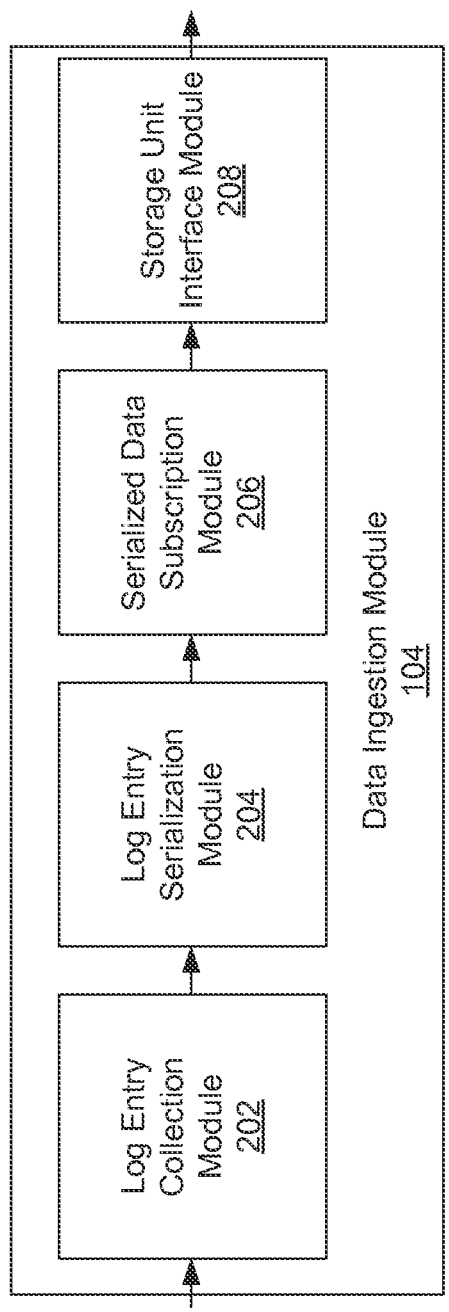
FIG. 2 shows an example of a data ingestion module, in accordance with some embodiments.
Figure 3:
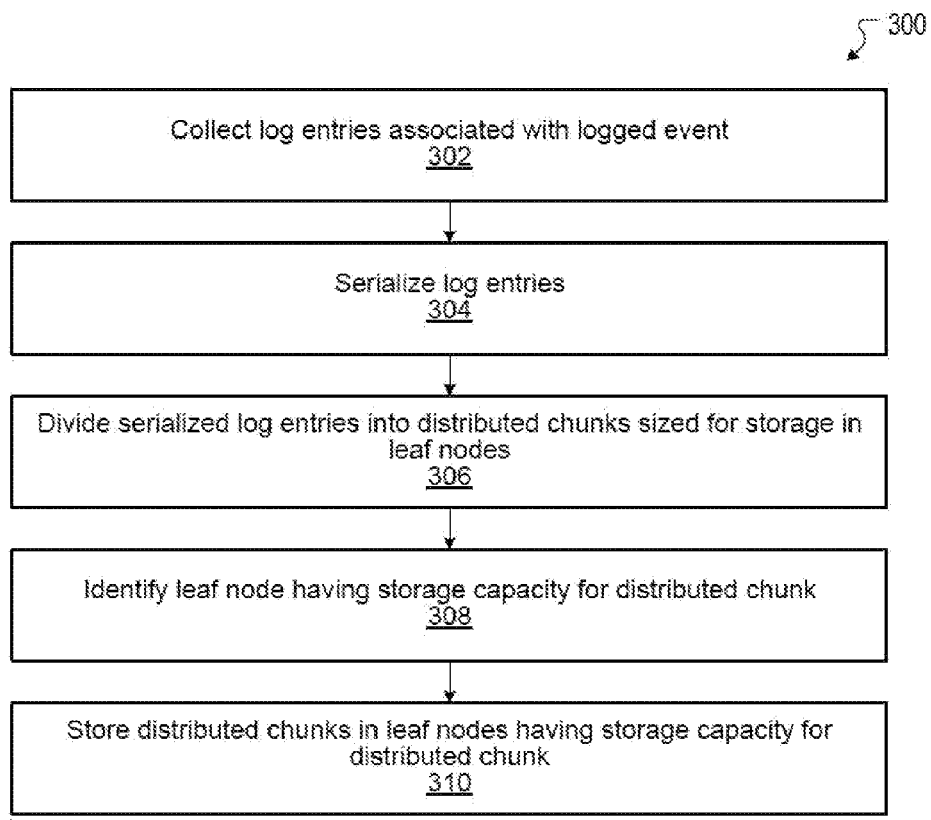
FIG. 3 shows an example of a process for data ingestion, in accordance with some embodiments.

The data ingestion module 104 may ingest data from the data source module 102, and store the data in the in-memory data storage module 106. In some embodiments, the data ingestion module 104 may write the log entries to the in-memory data storage module 106 as the log entries are received from the data source module 102. The data ingestion module 104 may also convert log entries from the data source module 102 to a format compatible with the datastores of the in-memory data storage module 106. For instance, in some embodiments, the data ingestion module 104 may serialize log entries from the data source module 102. The serialized log entries may be stored in the in-memory data storage module 106. The data ingestion module 104 may also efficiently select blank datastores in the in-memory data storage module 106. FIG. 2 and FIG. 3 further show the data ingestion module 104.

The in-memory data storage module 106 may include in-memory data storage units that store event data relating to events captured by the data source module 102. In-memory data storage units may include logical units that are dedicated to providing dynamic memory, such as random access memory (RAM), for storing data. The in-memory data storage units may be implemented by a hierarchical structure that facilitates rapid queries of stored data. For instance, the in-memory data storage module 106 may include a tree with leaf nodes to store the event data in an unaggregated state. The tree in the in-memory data storage module 106 may further include aggregator nodes that query the leaf nodes for the event data. The aggregator nodes of the in-memory data storage module 106 may also aggregate data that is received as a result of queries to the leaf nodes. Though the discussion herein refers to "leaf nodes," those of ordinary skill in the art will appreciate that the inventive concepts described herein may apply to in-memory data storage units that are implemented in a non-hierarchical manner.

In some embodiments, the in-memory data storage module 106 may be implemented by one or more clusters of computers configured to provide dynamic memory for storage. In an embodiment, the in-memory data storage module 106 may include several hundred servers each having 144 Gigabytes (GB) of RAM dedicated to storing data relating to the events captured by the data source module 102.

Figure 4:
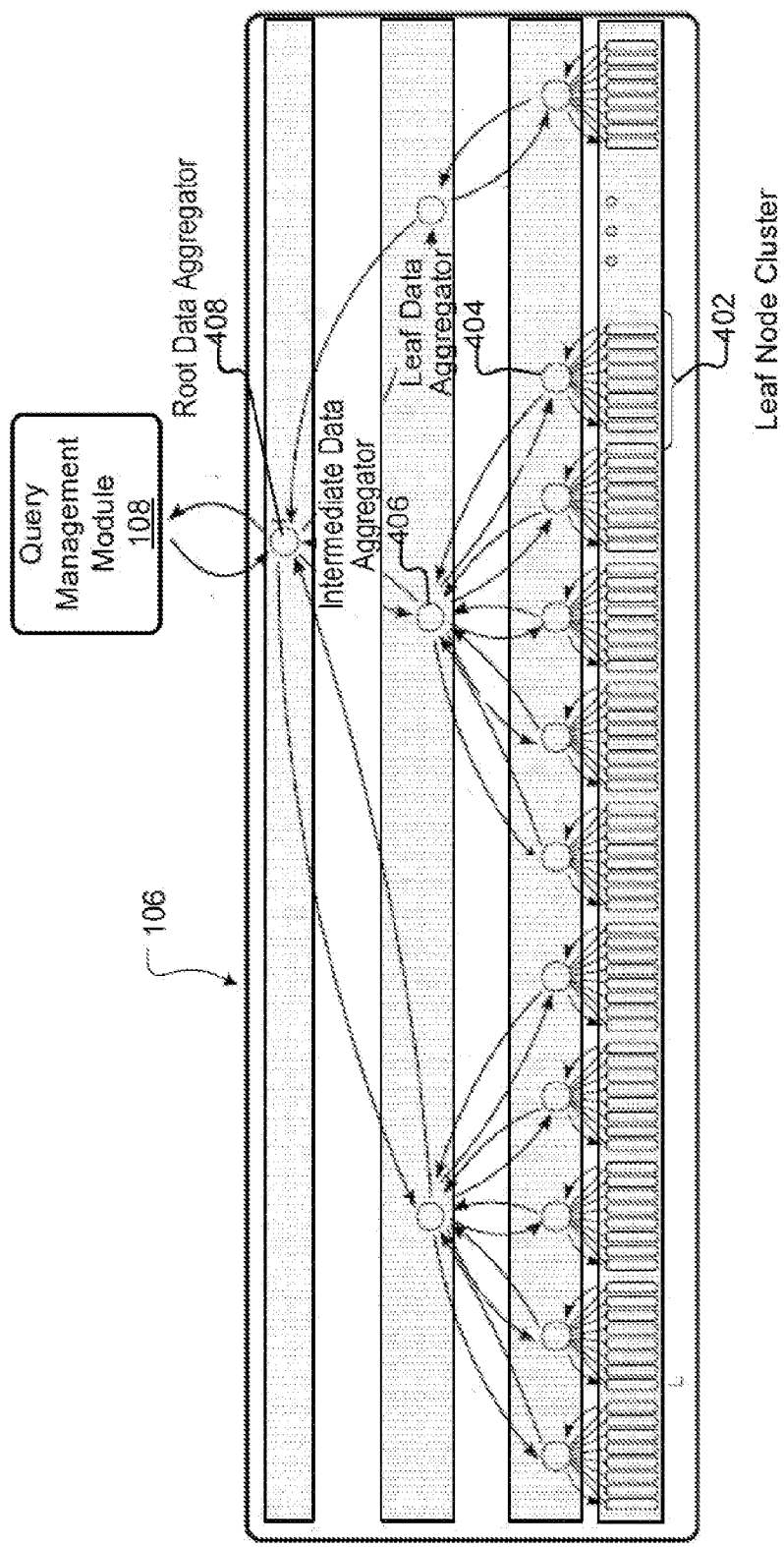
FIG. 4 shows an example of an in-memory data storage module, in accordance with some embodiments.

The in-memory data storage module 106 may clear the leaf nodes periodically. For instance, the in-memory data storage module 106 may delete data stored for a specified prior period, e.g., a month, in its storage units. As a result, in some embodiments, the in-memory data storage module 106 may provide an easily accessible snapshot of recent events captured by the data source module 102. FIG. 4 further shows the in-memory data storage module 106.

Figure 5:
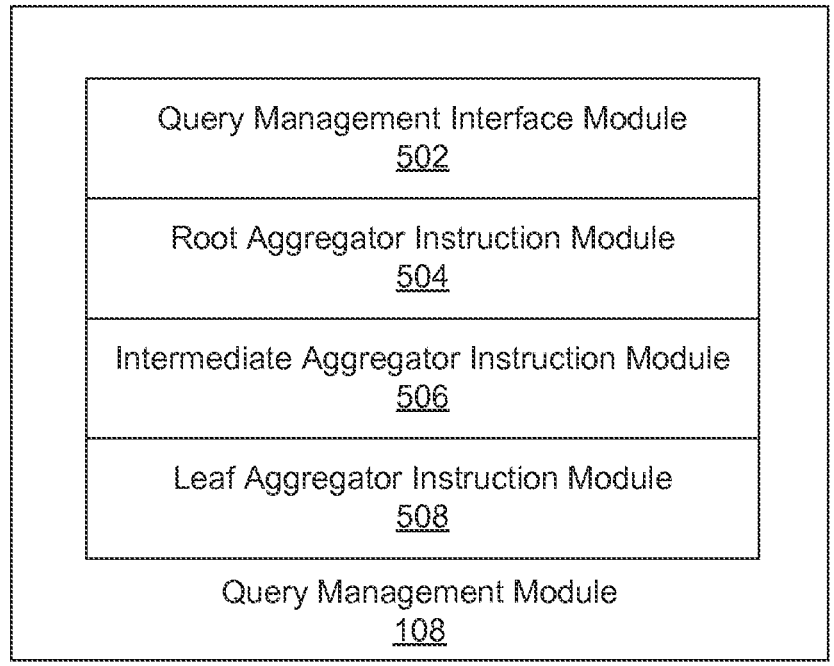
FIG. 5 shows an example of a query management module, in accordance with some embodiments.
Figure 6:
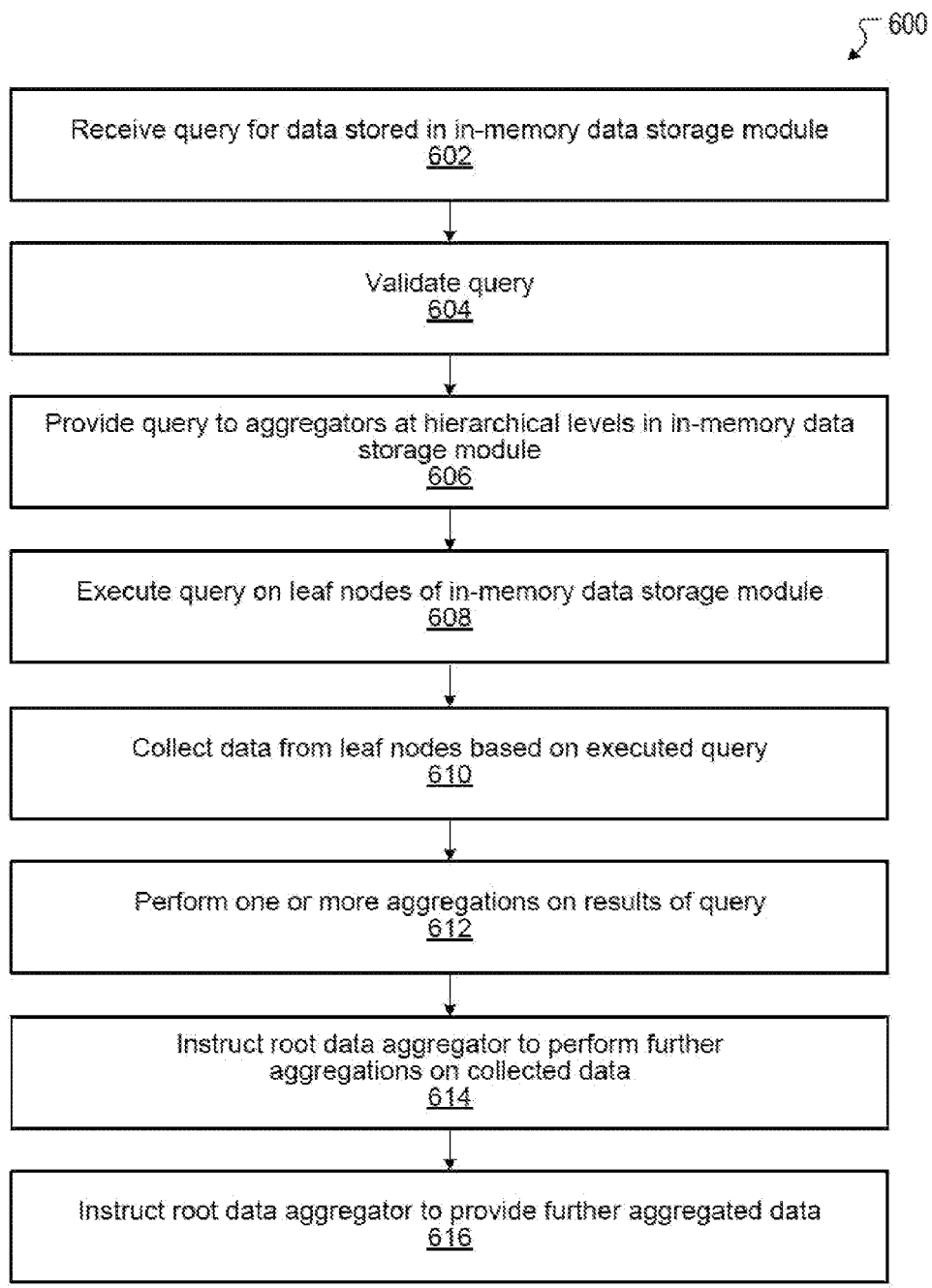
FIG. 6 shows an example of a process for query execution, in accordance with some embodiments.

The query management module 108 may query the in-memory data storage module 106 for data stored in leaf nodes. More specifically, the query management module 108 may support one or more interfaces that allow users to obtain data stored in the in-memory data storage module 106. The query management module 108 may also support various application programming interfaces (APIs), including web-based APIs, SQL interfaces, and/or other interfaces. The query management module 108 may further support a hierarchical aggregation model of event data in the in-memory data storage module 106. That is, the query management module 108 may provide instructions to aggregator nodes in the in-memory data storage module 106 to aggregate data from the leaf nodes of the in-memory data storage module 106 in a hierarchical manner. FIG. 5 and FIG. 6 further show the query management module 108.

FIG. 2 shows an example of a data ingestion module 104, in accordance with some embodiments. The data ingestion module 104 may comprise a log entry collection module 202, a log entry serialization module 204, a serialized data subscription module 206, and a storage unit interface module 208. The data ingestion module 104 may ingest data from the data source module 102 for storage in the in-memory data storage module 106. As discussed herein, the data ingestion module 104 may rapidly ingest log entries of events in a social networking system. The data ingestion module 104 may also rapidly write the log entries to the in-memory data storage module 106.

The log entry collection module 202 may collect log entries from the data source module 102. In an embodiment, the log entry collection module 202 may be implemented as scribeh computer clusters having Scribe servers running on Hadoop clusters. In this regard, the Scribe servers may aggregate logs coming from different web servers and write them as HDFS files in the associated Hadoop cluster. Collecting log entries may involve sampling the data provided by the data source module 102. For instance, in some embodiments, the log entry collection module 202 may collect only a fraction of the data from the data source module 102. As discussed herein, the sampling may later be compensated for when stored data is aggregated after a query.

In an embodiment, the log entry collection module 202 may collect a table of events logged from a social networking system as the events occur on the social networking system. The log entries from the data source module 102 may have a standardized data format that describes events occurring on a social networking system. As a result, in some embodiments, the log entry collection module 202 may receive a table of log entries indexed by the UNIX timestamp of the events represented by the log entries. Each log entry may have its remaining fields populated with information about a particular event occurring on the social networking system. In this example, the log entry collection module 202 may collect rows of the table as the rows are generated. Each row may describe an event occurring on the social networking system.

The log entry serialization module 204 may serialize the log entries received from the log entry collection module 202. In some embodiments, the log entry serialization module 204 may convert the log entries from a standardized data format (e.g., a table that represents events on a social networking system) into a format that can be stored in the in-memory data storage module 106. For instance, the log entry serialization module 204 may convert the log entries from the standardized data format into a serial array (e.g., an array having a JavaScript Object Notation (JSON) format) that can be stored in the in-memory data storage module 106. In an embodiment, the log entry serialization module 204 may provide serialized log entries to the serialized data subscription module 206. The serialized log entries may include a set of log lines that describe the information in the table provided by the log entry collection module 202.

The serialized data subscription module 206 may determine categories of log entries that are relevant for storage in the in-memory data storage module 106. The serialized data subscription module 206 may also subscribe to relevant categories of log entries. Log entries having categories deemed relevant by the serialized data subscription module 206 may be provided to the storage unit interface module 208. In some embodiments, the serialized data subscription module 206 may implement one or more tailer processes to provide portions of the serialized log entries to the storage unit interface module 208. In some embodiments, the format of the data from the serialized data subscription module 206 to the storage unit interface module 208 may include a dynamic JSON (dJSON) format.

The storage unit interface module 208 may divide the serialized log entries into distributed chunks that are stored in leaf nodes of the in-memory data storage module 106. The size of the distributed chunks may be chosen to optimize storage in the leaf nodes. For instance, the storage unit interface module 208 may divide serialized log entries containing 100,000 log lines into fifty distributed chunks, each having 2,000 log lines. In various embodiments, the distributed chunks may be compatible with Thrift protocols.

The storage unit interface module 208 may store the distributed chunks of the serialized log entries in leaf nodes of the in-memory data storage module 106. The storage unit interface module 208 may also optimize storage of the distributed chunks in the leaf nodes. In an embodiment, the storage unit interface module 208 may select a plurality of leaf nodes at random. The storage unit interface module 208 may determine which of the plurality of leaf nodes has more storage capacity than the other selected leaf nodes. The storage unit interface module 208 may then store the distributed chunks in the leaf node that has more storage capacity. As a result, the storage unit interface module 208 may end up striping the rows of table in the log entries randomly across all of the leaf nodes in the in-memory data storage module 106. The resulting distribution across the leaf nodes of the in-memory data storage module 106 may provide a fast and flexible way to store log entries.

In some embodiments, the storage unit interface module 208 may manage a plurality of processing threads. For instance, the storage unit interface module 208 may create a separate processing thread for each distributed chunk being stored in a leaf node of the in-memory data storage module 106. Each time a distributed chunk is to be written to the leaf node of the in-memory data storage module 106, the storage unit interface module 208 may create a separate thread. The storage unit interface module 208 may also delete the threads as write operations are finished.

FIG. 3 shows an example of a process 300 for data ingestion, in accordance with some embodiments. The process 300 is shown in conjunction with the data ingestion module 104, shown in FIG. 2.

At block 302, the log entry collection module 202 may collect log entries associated with logged events. In some embodiments, the data source module 102 may provide the log entry collection module 202 with tables having rows that contain columns of data formatted in standardized data types. In some embodiments, collecting the log entries may comprise sampling the events logged by the data source module 102 at any suitable rate. For instance, in some embodiments, the log entry collection module 202 may sample and collect only one out of every 10,000 log entries that are provided to the log entry collection module 202. The log entry collection module 202 may implement other forms of sampling without departing from the scope and substance of the inventive concepts described herein. In various embodiments, the log entry collection module 202 may provide the collected log entries to the log entry serialization module 204.

At block 304, the log entry serialization module 204 may serialize the log entries. Serialization may involve converting the table format of the log entries to a serialized data format that can be efficiently stored in the in-memory data storage module 106. The serialized data subscription module 206 may determine categories of log entries that are relevant for storage in the in-memory data storage module 106. In some embodiments, the serialized data subscription module 206 may provide to the storage unit interface module 208 only those entries deemed relevant.

At block 306, the storage unit interface module 208 may divide the serialized log entries into distributed chunks that are sized for storage in leaf nodes. In some embodiments, the storage unit interface module 208 may choose the sizes of the distributed chunks to optimize storage in leaf nodes. For instance, the storage unit interface module 208 may divide 100,000 lines of serialized log entries from the serialized data subscription module 206 into 2,000 line chunks. The storage unit interface module 208 may also create a separate processing thread for each distributed chunk being stored.

At block 308, the storage unit interface module 208 may identify leaf nodes having storage capacity. In some embodiments, the storage unit interface module 208 may choose two of the leaf nodes of the in-memory data storage module 106 at random. The storage unit interface module 208 may further determine which of the two chosen leaf nodes has greater storage capacity. The storage unit interface module

208 may then choose the leaf node with greater storage capacity for writing the one or more of the distributed chunks to.

At block 310, the storage unit interface module 208 may store the distributed chunks in the leaf nodes based on storage capacity. For each distributed chunk, the storage unit interface module 208 may write the distributed chunk to a leaf nodes having greater storage capacity than another leaf node.

FIG. 4 shows an example of an in-memory data storage module 106, in accordance with some embodiments. The in-memory data storage module 106 may include a leaf node cluster 402, a leaf data aggregator 404, an intermediate data aggregator 406, and a root data aggregator 408. In FIG. 4, the in-memory data storage module 106 is shown coupled to the query management module 108, which is discussed in the context of FIG. 5 and FIG. 6.

The leaf node cluster 402 may include a cluster of leaf nodes dedicated to providing dynamic memory for storing data. The leaf nodes of the leaf node cluster 402 may share a specific region, a specific configuration, a specific set of computer systems, etc. The leaf nodes of the leaf node cluster 402 need not use a hard-drive or other persistent storage as their primary storage device. Rather, the leaf nodes of the leaf node cluster 402 may store data in their dynamic memory. The leaf nodes of the leaf node cluster 402 may comprise a memory server with a large amount of RAM configured to store the data.

The leaf nodes of the leaf node cluster 402 may also store distributed chunks that represent serialized log entries. In an embodiment, storing the distributed chunks may involve storing on persistent storage a compressed copy (e.g., a gzip copy) of the batch file for back-up purposes. Storing the distributed chunks may further involve reading the distributed chunks for new rows of information, compressing each column of the distributed chunks, and adding the information from the new rows into dynamic memory. In some embodiments, an event occurring on a social networking system may be represented in the leaf nodes of the leaf node cluster 402 within a short time (e.g., minutes) after the event occurred. The leaf nodes of the leaf node cluster 402 may also provide the distributed chunks of the serialized log entries to the leaf data aggregator 404 in response to queries for particular types of the distributed chunks of serialized log entries.

In some embodiments, the leaf nodes of the leaf node cluster 402 may optimize memory management by expiring stored data. Data may be expired based on one or more criteria, including an age criterion or a space criterion. More specifically, the leaf nodes of the leaf node cluster 402 may expire data that, based on the timestamp of the data, is determined to be too old for storage in the leaf node cluster 402. In an embodiment, the leaf nodes of the leaf node cluster 402 may expire data that is older than thirty days. The leaf nodes of the leaf node cluster 402 may also expire data that has exceeded space limits of the leaf nodes. In an embodiment, the leaf nodes of the leaf node cluster 402 may expire data that is larger than 100 GB. The leaf nodes of the leaf node cluster 402 may expire the data at specified intervals (e.g., every fifteen minutes).

The leaf nodes of the leaf node cluster 402 may impose special limits for particular types of events. For instance, in some embodiments, the leaf nodes of the leaf node cluster 402 may impose higher space limits for high volume tables. An example of a high volume table may include a table that provides network traffic in a social networking system. Another example of a high volume table may include a table that provides revenue-generating data like ad clicks, impressions, and the like.

The leaf nodes of the leaf node cluster 402 may also allow for subsampling of stored data in order to store some types of data longer than space limits allow. For instance, the leaf nodes of the leaf node cluster 402 may only keep a uniform fraction of rows older than a certain age. The leaf nodes of the leaf node cluster 402 may also implement other forms of sampling, such as stratified sampling, that allows for the leaf nodes to choose a more representative set of rows to keep for extended periods of time.

The leaf nodes of the leaf node cluster 402 may process queries for stored data. Each leaf node may return all stored data that complies with a time range of a query. In some embodiments, each leaf node need not aggregate the results of the query, and may instead allow leaf data aggregators, intermediate data aggregators, and root data aggregators to perform aggregations. The leaf node cluster 402 may also optimize searching of character strings by maintaining a per-query cache of results matching regular expressions. The per-query cache may be indexed by dictionary values of the string.

The leaf data aggregator 404 may receive queries for data stored in the leaf nodes of the leaf node cluster 402. In some embodiments, executing a query for distributed data may comprise searching the dynamic memory of the leaf nodes of the leaf node cluster 402 for the presence of particular data structures. For example, the leaf data aggregator 404 may search the dynamic memory of the leaf nodes of the leaf node cluster 402 for the presence of particular integers, particular strings, particular unordered sets of strings, and particular ordered vectors of strings. In an embodiment, the leaf data aggregator 404 may provide the queries to the leaf nodes of the leaf node cluster 402 in parallel. In response to these queries, one or more of the nodes of the leaf node cluster 402 may provide distributed chunks of the serialized log entries having the information requested in the query. In an embodiment, the queries may require a time range for data being requested.

The leaf data aggregator 404 may also aggregate portions of the data collected from the leaf node cluster 402. Aggregation may include combining data provided from the leaf nodes of the leaf node cluster 402. The aggregation by the leaf data aggregator 404 may perform common aggregation functions. Examples of aggregation functions include counting, determining a minimum value, determining a maximum value, determining a sum of data, determining averages, determining a sum over a time interval (e.g., a minute), determining percentiles, determining histograms, etc. Aggregation may involve determining the presence of common data, including common integers, common strings, common unordered sets of strings, and common ordered vectors of strings. In some embodiments, comparisons on fields containing strings or string sets may involve the use of regular expressions for parsing. The specific aggregations performed by the leaf data aggregator 404 may depend on the parameters of the queries provided to the leaf data aggregator 404. In some embodiments, the leaf data aggregator 404 may provide the aggregated data to the intermediate data aggregator 406.

In addition to common aggregation functions, the leaf data aggregator 404 may perform specialized leaf data aggregation functions. For instance, the leaf data aggregator 404 may apply sorting or time limit constraints to data from the leaf nodes of the leaf node cluster 402. In some embodiments, the leaf data aggregator 404 may collect statistics on whether each of the leaf nodes of the leaf node cluster 402 contained the information requested by the query or how many rows of data each of the leaf nodes processed. The leaf data aggregator 404 may also collect statistics on how many rows of each of the leaf nodes satisfied the query.

In an embodiment, the intermediate data aggregator 406 may identify, in response to an instruction from the root data aggregator 408, the set of leaf data aggregators with which the intermediate data aggregator 406 is associated. Identifying the set of leaf data aggregators may involve a fan-out from the intermediate data aggregator 406. For instance, the intermediate data aggregator 406 may receive an instruction from the root data aggregator 408 to identify a number of leaf data aggregators to provide queries to. In some embodiments, the intermediate data aggregator 406 may identify five leaf data aggregators with which it is associated to optimize query and aggregation times.

The intermediate data aggregator 406 may also aggregate data received from the leaf data aggregator 404 and other leaf data aggregators. For instance, the intermediate data aggregator 406 may perform common aggregation functions on data from the leaf data aggregators under the intermediate data aggregator 406.

The root data aggregator 408 may receive queries for data stored in the leaf nodes of the in-memory data storage module 106. In an embodiment, the root data aggregator 408 may identify, in response to an instruction from the query management module 108, the set of intermediate data aggregators under the root data aggregator 408. For instance, the root data aggregator 408 may receive an instruction from the query management module 108 to identify a number of intermediate data aggregators to provide queries to. Identifying the set of intermediate data aggregators may involve creating a fan-out from the root data aggregator 408. In some embodiments, the root data aggregator 408 may identify five intermediate data aggregators with which it is associated to optimize query and aggregation times.

The root data aggregator 408 may aggregate data from the intermediate data aggregators under the root data aggregator 408. The root data aggregator 408 may perform common aggregation functions on data from the intermediate data aggregators under the root data aggregator 408. In some embodiments, the root data aggregator 408 may format aggregation functions so that queries may efficiently propagate to the intermediate data aggregators under the root data aggregator 408. For instance, the root data aggregator 408 may replace average functions in queries with a sum function and a count function. After data from the query has been received from the intermediate data aggregators under the root data aggregator 408, the root data aggregator 408 may then compute aggregations of the data from the intermediate data aggregators under the root data aggregator 408. In some embodiments, the root data aggregator 408 may compute final results, including averages and percentiles. The root data aggregator 408 may also apply final sorting and limit constraints to any query before returning the results of the query to the query management module 108. In its final sorting process, the root data aggregator 408 may also compensate for any sampling performed by the data ingestion module 104.

Though the foregoing discussion detailed operation of the leaf node cluster 402 as an example, it is noted that the in-memory data storage module 106 may include multiple leaf node clusters, as shown in FIG. 4. Further, it is also noted that the in-memory data storage module 106 may include multiple leaf data aggregators, multiple intermediate data aggregator, and multiple root data aggregators. As such, FIG. 4 shows a first hierarchical level including multiple leaf node clusters, a second hierarchical level including multiple leaf data aggregators, a third hierarchical level including multiple intermediate data aggregators, and a fourth hierarchical level including a root data aggregator. In an embodiment, the in-memory data storage module 106 may include any suitable number of hierarchical levels of aggregators.

FIG. 5 shows an example of a query management module 108, in accordance with some embodiments. The query management module 108 may include a query management interface module 502, a root aggregator instruction module 504, an intermediate aggregator instruction module 506, and a leaf aggregator instruction module 508.

The query management interface module 502 may receive queries for data stored in the in-memory data storage module 106. In some embodiments, the query management interface module 502 may receive queries over one or more APIs. For instance, the query management interface module 502 may receive queries over a web-based API that provides users access to data in the in-memory data storage module 106. Such a web-based API may allow users to issue form-based queries of the in-memory data storage module 106. The web-based API may also allow users to choose ways to visualize the data stored in the in-memory data storage module 106. Examples of visualizations include pie charts, stacked area graphs, etc. In various embodiments, the query management interface module 502 may receive queries over a Structured Query Language (SQL) interface that supports SQL queries of the data in the in-memory data storage module 106. The query management interface module 502 may also provide users with other interfaces. The query management interface module 502 may provide any queries that it receives to the root aggregator instruction module 504.

The root aggregator instruction module 504 may validate queries. Validating a query may include evaluating whether the query has a format that can be processed by a leaf node of the leaf node cluster 402. In some embodiments, validating a query may include determining whether the query includes a request for a time range of data. Validating a query may also include determining whether the query correctly calls aggregation function calls. Validating a query may also involve checking whether the semantic parameters of the query are valid.

The root aggregator instruction engine 504 may provide queries at hierarchical levels in the in-memory data storage module 106. For instance, the root aggregator instruction module 504 may instruct the root data aggregator 408 to distribute queries to intermediate data aggregators. Distribution may involve the root data aggregator 408 finding intermediate data aggregators (e.g., the intermediate data aggregator 406 and other intermediate data aggregators) which are associated with the root data aggregator 408. The root aggregator instruction module 504 may also instruct the root data aggregator 408 to aggregate queries from the intermediate data aggregator 406 and other intermediate data aggregators associated with the root data aggregator 408.

The intermediate aggregator instruction module 506 may instruct intermediate data aggregators to find leaf data aggregators with which the intermediate data aggregators are associated. The intermediate aggregator instruction module 506 may also instruct intermediate data aggregators to distribute a query to associated leaf data aggregators. In some embodiments, the intermediate aggregator instruction module 506 may instruct intermediate data aggregators to aggregate the results of queries from leaf data aggregators. It is noted that the intermediate aggregator instruction module 506 may provide the instructions to the intermediate data aggregators through the root data aggregator 408. In various embodiments, the intermediate aggregator instruction module 506 may provide the instructions to the intermediate data aggregators directly.

The leaf aggregator instruction module 508 may instruct leaf data aggregators (e.g., the leaf data aggregator 404) to distribute the query to the leaf nodes (e.g., the leaf nodes of the leaf node cluster 402). In some embodiments, the leaf aggregator instruction module 508 may receive the results of queries of leaf nodes. The leaf aggregator instruction module 508 may also instruct the leaf data aggregators to aggregate data received from the leaf nodes.

FIG. 6 shows an example of a process 600 for query execution, in accordance with some embodiments. The process 600 is shown in conjunction with the in-memory data storage module 106, shown in FIG. 4, and the query management module 108, shown in FIG. 5.

The query may call for any data in any type of system. For example, with respect to a social networking system, the query may request information relating to any aspect of the social networking system, such as performance, user interaction, patterns or trends, or any other activities or events. In the example of a social networking system, the query may be submitted by an administrator or performance team personnel of the social networking system to inform about the operating conditions and effectiveness of the social networking system.

At block 602, the query management interface module 502 may receive a query for data stored in the in-memory data storage module 106. The query may arrive as a function call from a web-based API, a SQL query, or other interface. The query management interface module 502 may also provide the query to the root aggregator instruction module 504.

At block 604, the root aggregator instruction module 504 may validate the query. In some embodiments, the root aggregator instruction module 504 may parse a particular query and determine whether the syntax of the particular query would allow the query to be processed by a leaf node of the leaf node cluster 402.

At block 606, the root aggregator instruction module 504 may provide the query to aggregators at hierarchical levels in the in-memory data storage module 106. For instance, the root aggregator instruction module 504 may provide the query to one or more of the root data aggregator, the intermediate data aggregator 406 and the leaf data aggregator 404. In some embodiments, the root aggregator instruction module 504 may instruct the root data aggregator 408 to find intermediate data aggregators, such as the intermediate data aggregator 406, that are associated with the root data aggregator 408. The intermediate data aggregator 406 may in turn receive instructions from the intermediate aggregator instruction module 506 to provide the query to the leaf data aggregator 404. In some embodiments, the root aggregator instruction module 504 may directly instruct the root data aggregator 408 to provide the validated data directly to the leaf data aggregators, such as the leaf data aggregator 404.

At block 608, the leaf data aggregator 404 may execute the query on leaf nodes (e.g., the leaf node cluster 402) of the in-memory data storage module 106. In some embodiments, this may involve passing the query to the leaf nodes of the leaf node cluster 402 and/or performing the query on the leaf node cluster 402. In some embodiments, the leaf data aggregator 404 may execute the query against the information held in the memory of the leaf nodes of the leaf node cluster 402. For instance, the leaf data aggregator 404 may query integers, strings, unordered sets of strings, and ordered vectors of strings stored in the leaf nodes of the leaf node cluster 402 to determine whether the leaf node holds information relevant to the query.

At block 610, the leaf data aggregator 404 may collect data from leaf node of the leaf node cluster 402 based on the executed query.

At block 612, the leaf aggregator instruction module 508 may perform one or more aggregations on the results of the query to the leaf nodes of the leaf node cluster 402. In various embodiments, the leaf data aggregator 404 may collect the results of the query from the leaf nodes of the leaf node cluster 402, and may find common patterns in query results. In some embodiments, the intermediate aggregator instruction module 506 may instruct the intermediate data aggregator 406 to similarly aggregate the data from the leaf data aggregators under the intermediate data aggregator 406.

At block 614, the root aggregator instruction module 504 may perform further aggregations on the collected data. In some embodiments, the root data aggregator instruction module 504 may implement block 614 by instructing the root data aggregator 408 to perform the further aggregations. At block 616, the root aggregator instruction module 504 may instruct the root data aggregator 408 to provide the further aggregated data.

The aggregated data may be provided to the query management module 108 as the results of the query. For example, the query results may provide information about the performance of or events relating to a social networking system. The results may be provided to facilitate monitoring and optimization of the social networking system.

In an embodiment, the process 600 does not perform data aggregation until after a query is presented to the in-memory data storage module 106. In this regard, no pre-aggregation is performed on data in the in-memory data storage module 106 in anticipation of later receipt of a query. The absence of pre-aggregation may improve the speed of query processing.

Social Networking System—Example Implementation

Figure 7:
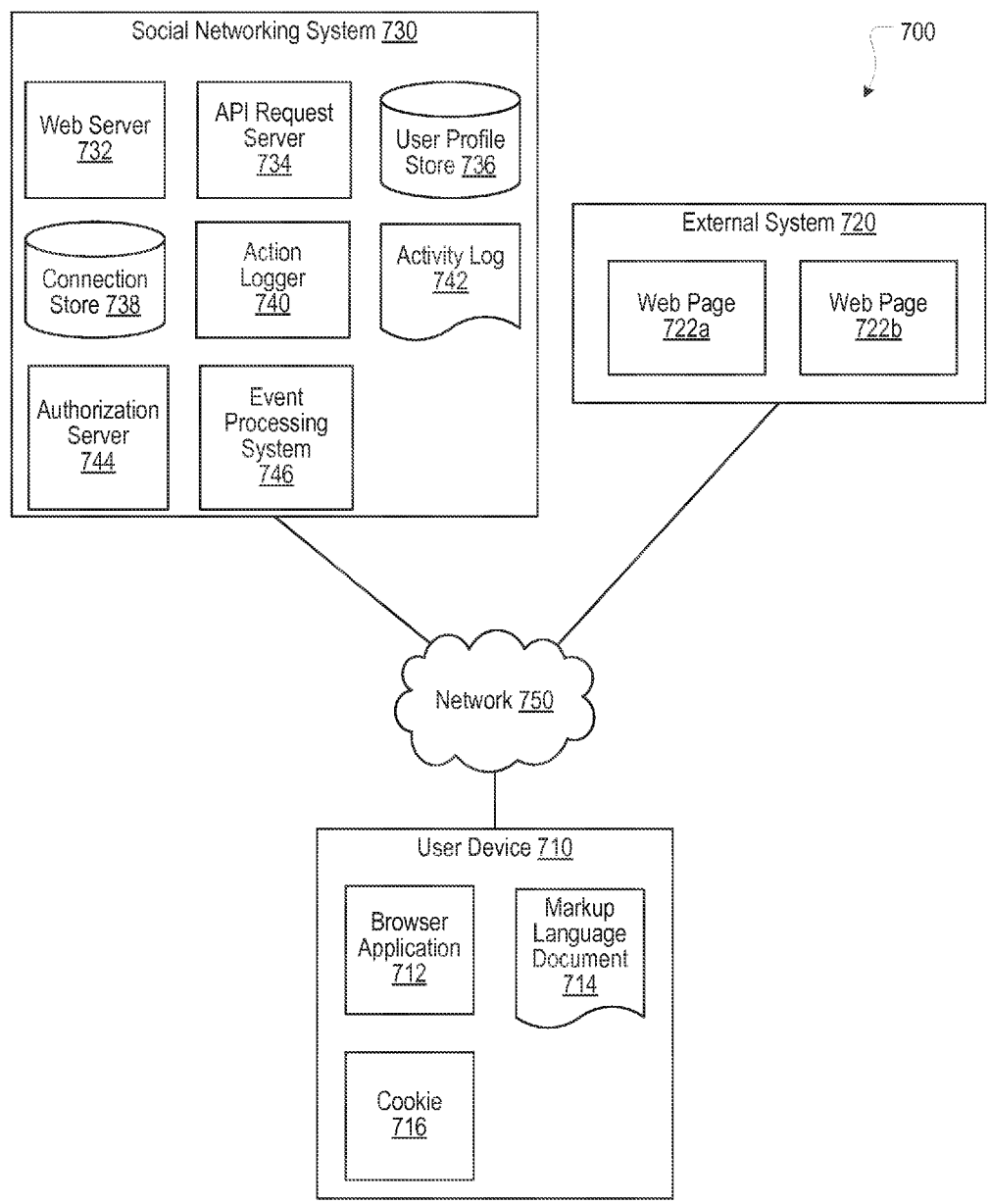
FIG. 7 shows an example of a network diagram of an event processing system within a social networking system, in accordance with some embodiments.

FIG. 7 shows a network diagram of an example social networking system 700 in which to implement the event processing system 100, in accordance with some embodiments. The social networking system 700 includes one or more user devices 710, one or more external systems 720, a social networking system 730, and a network 750. In an embodiment, the social networking system discussed in connection with the embodiments described above may be implemented as the social networking system 730. For purposes of illustration, the embodiment of the social networking system 700, shown by FIG. 7, includes a single external system 720 and a single user device 710. However, in other embodiments, the social networking system 700 may include more user devices 710 and/or more external systems 720. In certain embodiments, the social networking system 730 is operated by a social networking system provider, whereas the external systems 720 are separate from the social networking system 730 in that they may be operated by different entities. In various embodiments, however, the social networking system 730 and the external systems 720 operate in conjunction to provide social networking services to users (or members) of the social networking system 730. In this sense, the social networking system 730 provides a platform or backbone, which other systems, such as external systems 720, may use to provide social networking services and functionalities to users across the Internet.

The user device 710 comprises one or more computing devices that can receive input from a user and transmit and receive data via the network 750. In one embodiment, the user device 710 may include a conventional computer system executing, for example, a MICROSOFT WINDOWS compatible operating system (OS), APPLE OS X, and/or a LINUX distribution. In another embodiment, the user device 710 can be a device having computer functionality, such as a smart-phone, a tablet, a personal digital assistant (PDA), a mobile telephone, etc. The user device 710 is configured to communicate via the network 750. The user device 710 can execute an application, for example, a browser application that allows a user of the user device 710 to interact with the social networking system 730. In another embodiment, the user device 710 interacts with the social networking system 730 through an application programming interface (API) provided by the native operating system of the user device 710, such as iOS and ANDROID. The user device 710 is configured to communicate with the external system 720 and the social networking system 730 via the network 750, which may comprise any combination of local area and/or wide area networks, using wired and/or wireless communication systems.

In one embodiment, the network 750 uses standard communications technologies and protocols. Thus, the network 750 can include links using technologies such as Ethernet, 702.7, worldwide interoperability for microwave access (WiMAX), 3G, 4G, CDMA, GSM, LTE, digital subscriber line (DSL), etc. Similarly, the networking protocols used on the network 750 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 750 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 710 may display content from the external system 720 and/or from the social networking system 730 by processing a markup language document 714 received from the external system 720 and from the social networking system 730 using a browser application 712. The markup language document 714 identifies content and one or more instructions describing formatting or presentation of the content. By executing the instructions included in the markup language document 714, the browser application 712 displays the identified content using the format or presentation described by the markup language document 714. For example, the markup language document 714 includes instructions for generating and displaying a web page having multiple frames that include text and/or image data retrieved from the external system 720 and the social networking system 730. In various embodiments, the markup language document 714 comprises a data file including extensible markup language (XML) data, extensible hypertext markup language (XHTML) data, or other markup language data. Additionally, the markup language document 714 may include JavaScript Object Notation (JSON) data, JSON with padding (JSONP), and JavaScript data to facilitate data-interchange between the external system 720 and the user device 710. The browser application 712 on the user device 710 may use a JavaScript compiler to decode the markup language document 714.

The markup language document 714 may also include, or link to, applications or application frameworks such as FLASH™ or UNITY™ applications, the SILVERLIGHT™ application framework, etc.

In one embodiment, the user device 710 also includes one or more cookies 716 including data indicating whether a user of the user device 710 is logged into the social networking system 730, which may enable modification of the data communicated from the social networking system 730 to the user device 710.

The external system 720 includes one or more web servers that include one or more web pages 722a, 722b, which are communicated to the user device 710 using the network 750. The external system 720 is separate from the social networking system 730. For example, the external system 720 is associated with a first domain, while the social networking system 730 is associated with a separate social networking domain. Web pages 722a, 722b, included in the external system 720, comprise markup language documents 714 identifying content and including instructions specifying formatting or presentation of the identified content.

The social networking system 730 includes one or more computing devices for a social networking system, including a plurality of users, and providing users of the social networking system with the ability to communicate and interact with other users of the social networking system. In some instances, the social networking system can be represented by a graph, i.e., a data structure including edges and nodes. Other data structures can also be used to represent the social networking system, including but not limited to databases, objects, classes, meta elements, files, or any other data structure. The social networking system 730 may be administered, managed, or controlled by an administrator. The administrator of the social networking system 730 may be a human being, an automated application, or a series of applications for managing content, regulating policies, and collecting usage metrics within the social networking system 730. Any type of administrator may be used.

Users may join the social networking system 730 and then add connections to any number of other users of the social networking system 730 to whom they desire to be connected. As used herein, the term "friend" refers to any other user of the social networking system 730 to whom a user has formed a connection, association, or relationship via the social networking system 730. For example, in an embodiment, if users in the social networking system 730 are represented as nodes in the social graph, the term "friend" can refer to an edge formed between and directly connecting two user nodes.

Connections may be added explicitly by a user or may be automatically created by the social networking system 730 based on common characteristics of the users (e.g., users who are alumni of the same educational institution). For example, a first user specifically selects a particular other user to be a friend. Connections in the social networking system 730 are usually in both directions, but need not be, so the terms "user" and "friend" depend on the frame of reference. Connections between users of the social networking system 730 are usually bilateral ("two-way"), or "mutual," but connections may also be unilateral, or "one-way." For example, if Bob and Joe are both users of the social networking system 730 and connected to each other, Bob and Joe are each other's connections. If, on the other hand, Bob wishes to connect to Joe to view data communicated to the social networking system 730 by Joe, but Joe does not wish to form a mutual connection, a unilateral connection may be established. The connection between users may be a direct connection; however, some embodiments of the social networking system 730 allow the connection to be indirect via one or more levels of connections or degrees of separation.

In addition to establishing and maintaining connections between users and allowing interactions between users, the social networking system 730 provides users with the ability to take actions on various types of items supported by the social networking system 730. These items may include groups or networks (i.e., social networks of people, entities, and concepts) to which users of the social networking system 730 may belong, events or calendar entries in which a user might be interested, computer-based applications that a user may use via the social networking system 730, transactions that allow users to buy or sell items via services provided by or through the social networking system 730, and interactions with advertisements that a user may perform on or off the social networking system 730. These are just a few examples of the items upon which a user may act on the social networking system 730, and many others are possible. A user may interact with anything that is capable of being represented in the social networking system 730 or in the external system 720, separate from the social networking system 730, or coupled to the social networking system 730 via the network 750.

The social networking system 730 is also capable of linking a variety of entities. For example, the social networking system 730 enables users to interact with each other as well as external systems 720 or other entities through an API, a web service, or other communication channels. The social networking system 730 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 730. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 730 modifies edges connecting the various nodes to reflect the relationships and interactions.

The social networking system 730 also includes user-generated content, which enhances a user's interactions with the social networking system 730. User-generated content may include anything a user can add, upload, send, or "post" to the social networking system 730. For example, a user communicates posts to the social networking system 730 from a user device 710. Posts may include data such as status updates or other textual data, location information, images such as photos, videos, links, music or other similar data and/or media. Content may also be added to the social networking system 730 by a third party. Content "items" are represented as objects in the social networking system 730. In this way, users of the social networking system 730 are encouraged to communicate with each other by posting text and content items of various types of media through various communication channels. Such communication increases the interaction of users with each other and increases the frequency with which users interact with the social networking system 730.

The social networking system 730 includes a web server 732, an API request server 734, a user profile store 736, a connection store 738, an action logger 740, an activity log 742, an authorization server 744 and an event processing system 746. In an embodiment, the social networking system 730 may include additional, fewer, or different components for various applications. Other components, such as network interfaces, security mechanisms, load balancers, failover servers, management and network operations consoles, and the like are not shown so as to not obscure the details of the system.

The user profile store 736 maintains information about user accounts, including biographic, demographic, and other types of descriptive information, such as work experience, educational history, hobbies or preferences, location, and the like that has been declared by users or inferred by the social networking system 730. This information is stored in the user profile store 736 such that each user is uniquely identified. The social networking system 730 also stores data describing one or more connections between different users in the connection store 738. The connection information may indicate users who have similar or common work experience, group memberships, hobbies, or educational history. Additionally, the social networking system 730 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 730, such as non-person entities, buckets, cluster centers, images, interests, pages, external systems, concepts, and the like are also stored in the connection store 738.

The social networking system 730 maintains data about objects with which a user may interact. To maintain this data, the user profile store 736 and the connection store 738 store instances of the corresponding type of objects maintained by the social networking system 730. Each object type has information fields that are suitable for storing information appropriate to the type of object. For example, the user profile store 736 contains data structures with fields suitable for describing a user's account and information related to a user's account. When a new object of a particular type is created, the social networking system 730 initializes a new data structure of the corresponding type, assigns a unique object identifier to it, and begins to add data to the object as needed. This might occur, for example, when a user becomes a user of the social networking system 730, the social networking system 730 generates a new instance of a user profile in the user profile store 736, assigns a unique identifier to the user account, and begins to populate the fields of the user account with information provided by the user.

The connection store 738 includes data structures suitable for describing a user's connections to other users, connections to external systems 720 or connections to other entities. The connection store 738 may also associate a connection type with a user's connections, which may be used in conjunction with the user's privacy setting to regulate access to information about the user. In an embodiment, the user profile store 736 and the connection store 738 may be implemented as a federated database.

Data stored in the connection store 738, the user profile store 736, and the activity log 742 enables the social networking system 730 to generate the social graph that uses nodes to identify various objects and edges connecting nodes to identify relationships between different objects. For example, if a first user establishes a connection with a second user in the social networking system 730, user accounts of the first user and the second user from the user profile store 736 may act as nodes in the social graph. The connection between the first user and the second user stored by the connection store 738 is an edge between the nodes associated with the first user and the second user. Continuing this example, the second user may then send the first user a message within the social networking system 730. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 730 (or, alternatively, in an image maintained by another system outside of the social networking system 730). The image may itself be represented as a node in the social networking system 730. This tagging action may create edges between the first user and the second user as well as create an edge between each of the users and the image, which is also a node in the social graph. In yet another example, if a user confirms attending an event, the user and the event are nodes obtained from the user profile store 736, where the attendance of the event is an edge between the nodes that may be retrieved from the activity log 742. By generating and maintaining the social graph, the social networking system 730 includes data describing many different types of objects and the interactions and connections among those objects, providing a rich source of socially relevant information.

The web server 732 links the social networking system 730 to one or more user devices 710 and/or one or more external systems 720 via the network 750. The web server 732 serves web pages, as well as other web-related content, such as Java, JavaScript, FLASH, XML, and so forth. The web server 732 may include a mail server or other messaging functionality for receiving and routing messages between the social networking system 730 and one or more user devices 710. The messages can be instant messages, queued messages (e.g., email), text and SMS messages, or any other suitable messaging format.

The API request server 734 allows one or more external systems 720 and user devices 710 to call access information from the social networking system 730 by calling one or more API functions. The API request server 734 may also allow external systems 720 to send information to the social networking system 730 by calling APIs. The external system 720, in one embodiment, sends an API request to the social networking system 730 via the network 750, and the API request server 734 receives the API request. The API request server 734 processes the request by calling an API associated with the API request to generate an appropriate response, which the API request server 734 communicates to the external system 720 via the network 750. For example, responsive to an API request, the API request server 734 collects data associated with a user, such as the user's connections that have logged into the external system 720, and communicates the collected data to the external system 720. In another embodiment, the user device 710 communicates with the social networking system 730 via APIs in the same manner as external systems 720.

The action logger 740 is capable of receiving communications from the web server 732 about user actions on and/or off the social networking system 730. The action logger 740 populates the activity log 742 with information about user actions, enabling the social networking system 730 to discover various actions taken by its users within the social networking system 730 and outside of the social networking system 730. Any action that a particular user takes with respect to another node on the social networking system 730 may be associated with each user's account, through information maintained in the activity log 742 or in a similar database or other data repository. Examples of actions taken by a user within the social networking system 730 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 730, the action is recorded in the activity log 742. In one embodiment, the social networking system 730 maintains the activity log 742 as a database of entries. When an action is taken within the social networking system 730, an entry for the action is added to the activity log 742. The activity log 742 may be referred to as an action log.

Additionally, user actions may be associated with concepts and actions that occur within an entity outside of the social networking system 730, such as an external system 720 that is separate from the social networking system 730. For example, the action logger 740 may receive data describing a user's interaction with an external system 720 from the web server 732. In this example, the external system 720 reports a user's interaction according to structured actions and objects in the social graph.

Other examples of actions where a user interacts with an external system 720 include a user expressing an interest in an external system 720 or another entity, a user posting a comment to the social networking system 730 that discusses an external system 720 or a web page 722a within the external system 720, a user posting to the social networking system 730 a Uniform Resource Locator (URL) or other identifier associated with an external system 720, a user attending an event associated with an external system 720, or any other action by a user that is related to an external system 720. Thus, the activity log 742 may include actions describing interactions between a user of the social networking system 730 and an external system 720 that is separate from the social networking system 730.

The authorization server 744 enforces one or more privacy settings of the users of the social networking system 730. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 720, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 720. One embodiment allows the specification of the set of entities to comprise an enumeration of entities. For example, the user may provide a list of external systems 720 that are allowed to access certain information. Another embodiment allows the specification to comprise a set of entities along with exceptions that are not allowed to access the information. For example, a user may allow all external systems 720 to access the user's work information, but specify a list of external systems 720 that are not allowed to access the work information. Certain embodiments call the list of exceptions that are not allowed to access certain information a "block list". External systems 720 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 744 contains logic to determine if certain information associated with a user can be accessed by a user's friends, external systems 720, and/or other applications and entities. The external system 720 may need authorization from the authorization server 744 to access the user's more private and sensitive information, such as the user's work phone number. Based on the user's privacy settings, the authorization server 744 determines if another user, the external system 720, an application, or another entity is allowed to access information associated with the user, including information about actions taken by the user.

The social networking system 730 may include an event processing system 746. The event processing system 746 may allow administrators or performance team personnel of the social networking system 730 to monitor and analyze any aspect of the operation of the social networking system 730. In an embodiment, the event processing system 746 may be implemented as the event processing system 100, as discussed in more detail herein. In an embodiment, the event processing system 746 may ingest log entries regarding events associated with the social networking system 730 from data sources and may format the log entries for storage in leaf nodes of an in-memory data storage module. The event processing system 746 may also query the in-memory data storage module. A query may be provided to aggregators at various hierarchical levels and then provided to leaf nodes to obtain query results. The results may be provided from the leaf nodes through intermediate hierarchical levels of aggregators and finally to a root data aggregator. The aggregated results may constitute query results that may be provided to a query management module.

Hardware Implementation

Figure 8:
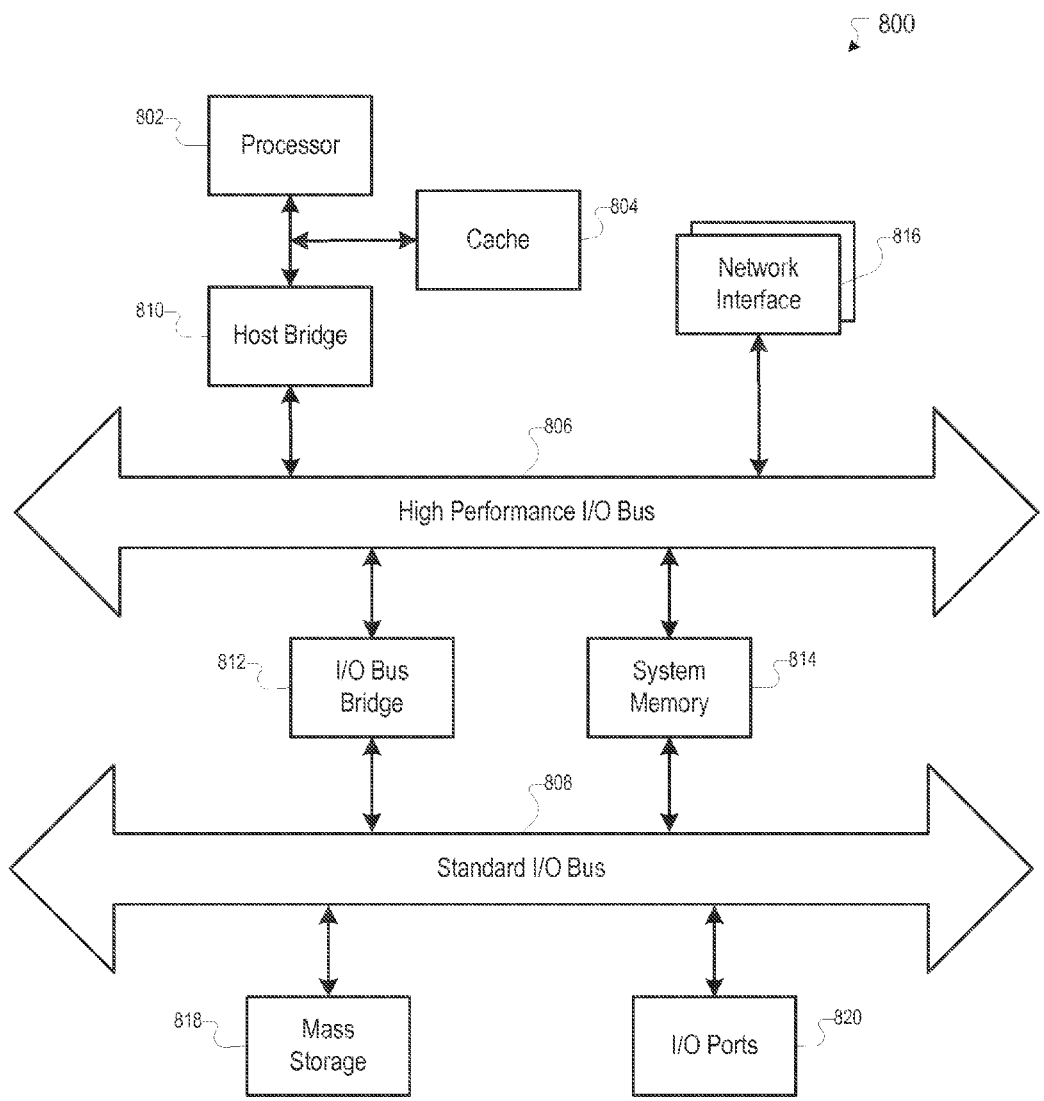
FIG. 8 shows an example of a computer system that may be used to implement one or more of the embodiments described herein in accordance with some embodiments.

The foregoing processes and features can be implemented by a wide variety of machine and computer system architectures and in a wide variety of network and computing environments. FIG. 8 illustrates an example of a computer system 800 that may be used to implement one or more of the embodiments described herein in accordance with an embodiment. The computer system 800 includes sets of instructions for causing the computer system 800 to perform the processes and features discussed herein. The computer system 800 may be connected (e.g., networked) to other machines. In a networked deployment, the computer system 800 may operate in the capacity of a server machine or a client machine in a client-server network environment, or as a peer machine in a peer-to-peer (or distributed) network environment. In an embodiment, the computer system 800 may be the social networking system 730, the user device 710, the external system 720, or a component thereof. In an embodiment, the computer system 800 may be one server among many that constitutes all or part of the social networking system 730.

The computer system 800 includes a processor 802, a cache 804, and one or more executable modules and drivers, stored on a computer-readable medium, directed to the processes and features described herein. Additionally, the computer system 800 includes a high performance input/output (I/O) bus 806 and a standard I/O bus 808. A host bridge 810 couples processor 802 to high performance I/O bus 806, whereas I/O bus bridge 812 couples the two buses 806 and 808 to each other. A system memory 814 and a network interface 816 couple to high performance I/O bus 806. The computer system 800 may further include video memory and a display device coupled to the video memory (not shown). Mass storage 818 and I/O ports 820 couple to the standard I/O bus 808. The computer system 800 may optionally include a keyboard and pointing device, a display device, or other input/output devices (not shown) coupled to the standard I/O bus 808. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 800, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 800 are described in greater detail below. In particular, the network interface 816 provides communication between the computer system 800 and any of a wide range of networks, such as an Ethernet (e.g., IEEE 802.3) network, a backplane, etc. The mass storage 818 provides permanent storage for the data and programming instructions to perform the above-described processes and features implemented by the respective computing systems identified above, whereas the system memory 814 (e.g., DRAM) provides temporary storage for the data and programming instructions when executed by the processor 802. The I/O ports 820 may be one or more serial and/or parallel communication ports that provide communication between additional peripheral devices, which may be coupled to the computer system 800.

The computer system 800 may include a variety of system architectures, and various components of the computer system 800 may be rearranged. For example, the cache 804 may be on-chip with processor 802. Alternatively, the cache 804 and the processor 802 may be packed together as a "processor module", with processor 802 being referred to as the "processor core". Furthermore, certain embodiments may neither require nor include all of the above components. For example, peripheral devices coupled to the standard I/O bus 808 may couple to the high performance I/O bus 806. In addition, in some embodiments, only a single bus may exist, with the components of the computer system 800 being coupled to the single bus. Furthermore, the computer system 800 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 800 that, when read and executed by one or more processors, cause the computer system 800 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 800, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 802. Initially, the series of instructions may be stored on a storage device, such as the mass storage 818. However, the series of instructions can be stored on any suitable computer readable storage medium. Furthermore, the series of instructions need not be stored locally, and could be received from a remote storage device, such as a server on a network, via the network interface 816. The instructions are copied from the storage device, such as the mass storage 818, into the system memory 814 and then accessed and executed by the processor 802. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 800 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "some embodiments", "other embodiments", "another embodiment", "various embodiments", "certain embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope be limited not by this detailed description, but rather by any claims that issue on an application based hereon. Accordingly, the disclosure of the embodiments is intended to be illustrative, but not limiting, of the scope, which is set forth in the following claims.

What is claimed:

1. A system comprising:
   at least one processor; and
   a memory storing instructions configured to instruct the at least one processor to perform:
   serializing log entries associated with at least one logged event;
   dividing the serialized log entries into one or more distributed chunks for storage in one or more leaf nodes of an in-memory data storage module, wherein storage of at least one of the distributed chunks is striped across at least two randomly selected leaf nodes, and wherein a corresponding space limit of each of the one or more leaf nodes is adjusted based at least in part on a type of data being stored at the leaf node;
   providing a query to aggregators at hierarchical levels in the in-memory data storage module, wherein the aggregators are configured to pre-aggregate at least some data stored in the one or more leaf nodes of the in-memory data storage module in anticipation of the query;
providing the query to leaf nodes of the in-memory data storage module;
executing the query on the leaf nodes;
returning results of the query to the aggregators;
performing one or more aggregations on the results of the query; and
updating a query cache that corresponds to the query to include data describing the results.

2. The system of claim 1, wherein the aggregators comprise one or more of a root data aggregator, an intermediate data aggregator, or a leaf data aggregator.

3. The system of claim 1, wherein the providing the query to leaf nodes comprises identifying a plurality of leaf data aggregators to provide the query to the plurality of leaf nodes.

4. The system of claim 1, wherein the instructions are configured to instruct the at least one processor to perform receiving the query using a web application programming interface (API) or a structured query language (SQL) interface.

5. The system of claim 1, wherein the performing one or more aggregations comprises instructing at least one of the aggregators to perform leaf data aggregation.

6. The system of claim 1, wherein the performing one or more aggregations comprises instructing at least one of the aggregators to perform intermediate data aggregation.

7. The system of claim 1, wherein the performing one or more aggregations comprises instructing at least one of the aggregators to perform root data aggregation.

8. The system of claim 1, wherein the performing one or more aggregations comprises determining at least one of a count, a minimum value, a maximum value, a sum, an average, a percentile, or a histogram.

9. The system of claim 1, wherein the instructions are configured to instruct the at least one processor to perform validating the query.

10. The system of claim 9, wherein the validating the query comprises determining whether the query includes a request for a time range of data.

11. The system of claim 9, wherein the validating the query comprises determining whether the query correctly calls an aggregation function.

12. The system of claim 9, wherein the validating the query comprises determining whether semantic parameters of the query are valid.

13. The system of claim 1, wherein the leaf nodes are configured to expire data based on an age criterion or a space criterion.

14. The system of claim 1, wherein the instructions are configured to instruct the at least one processor to perform:
randomly selecting a first leaf node and a second leaf node from the leaf nodes;
determining the first leaf node has greater storage capacity than the second leaf node; and
selecting the first leaf node for storage of the distributed chunk.

15. The system of claim 1, wherein the logged event comprises one or more of a performance event on a computing system, user interaction with the computing system, or a behavioral event on the computing system.

16. The system of claim 1, wherein the system is incorporated into a social networking system.

17. A computer implemented method comprising:
serializing log entries associated with at least one logged event;
dividing the serialized log entries into one or more distributed chunks for storage in one or more leaf nodes of an in-memory data storage module, wherein storage of at least one of the distributed chunks is striped across at least two randomly selected leaf nodes, and wherein a corresponding space limit of each of the one or more leaf nodes is adjusted based at least in part on a type of data being stored at the leaf node;
providing, by a computer system, a query to aggregators at hierarchical levels in the in-memory data storage module, wherein the aggregators are configured to pre-aggregate at least some data stored in the one or more leaf nodes of the in-memory data storage module in anticipation of the query;
providing, by the computer system, the query to leaf nodes of the in-memory data storage module;
executing, by the computer system, the query on the leaf nodes;
returning, by the computer system, results of the query to the aggregators;
performing, by the computer system, one or more aggregations on the results of the query; and
updating a query cache that corresponds to the query to include data describing the results.

18. A non-transitory computer storage medium storing computer-executable instructions that, when executed, cause a computer system to perform a computer-implemented method comprising:
serializing log entries associated with at least one logged event;
dividing the serialized log entries into one or more distributed chunks for storage in one or more leaf nodes of an in-memory data storage module, wherein storage of at least one of the distributed chunks is striped across at least two randomly selected leaf nodes, and wherein a corresponding space limit of each of the one or more leaf nodes is adjusted based at least in part on a type of data being stored at the leaf node;
providing a query to aggregators at hierarchical levels in the in-memory data storage module, wherein the aggregators are configured to pre-aggregate at least some data stored in the one or more leaf nodes of the in-memory data storage module in anticipation of the query;
providing the query to leaf nodes of the in-memory data storage module;
executing the query on the leaf nodes;
returning results of the query to the aggregators;
performing one or more aggregations on the results of the query and
updating a query cache that corresponds to the query to include data describing the results.

* * * * *